(12) United States Patent
Pinschmidt et al.

(10) Patent No.: US 10,995,840 B2
(45) Date of Patent: *May 4, 2021

(54) DRIVE DEVICE FOR A VEHICLE AXLE OF A TWO-TRACK VEHICLE

(71) Applicant: AUDI AG, Ingolstadt (DE)

(72) Inventors: Udo Pinschmidt, Gaimersheim (DE); Steffen Hummel, Sergen (DE); Christian Wirth, Eichenried (DE)

(73) Assignee: AUDI AG, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/762,610

(22) PCT Filed: Oct. 18, 2018

(86) PCT No.: PCT/EP2018/078617
§ 371 (c)(1),
(2) Date: May 8, 2020

(87) PCT Pub. No.: WO2019/091749
PCT Pub. Date: May 16, 2019

(65) Prior Publication Data
US 2020/0271208 A1 Aug. 27, 2020

(30) Foreign Application Priority Data
Nov. 13, 2017 (DE) ...................... 10 2017 220 168.1

(51) Int. Cl.
*F16H 48/36* (2012.01)
*B60K 6/26* (2007.10)
*B60K 6/365* (2007.10)

(52) U.S. Cl.
CPC ............... *F16H 48/36* (2013.01); *B60K 6/26* (2013.01); *B60K 6/365* (2013.01);
(Continued)

(58) Field of Classification Search
None
See application file for complete search history.

(56) References Cited

U.S. PATENT DOCUMENTS 9,701,187 B2 * 7/2017 Smetana ................. B60K 6/48
10,400,877 B2 * 9/2019 Pinschmidt ........... B60W 10/08
(Continued)

FOREIGN PATENT DOCUMENTS

DE 19721091 A1 11/1997
DE 102008037885 A1 3/2010
(Continued)

OTHER PUBLICATIONS

Machine translation of DE 102010036240 A1. Google patents. (Year: 2010).*

(Continued)

*Primary Examiner* — Dirk Wright
(74) *Attorney, Agent, or Firm* — Maier & Maier, PLLC

(57) ABSTRACT

A drive device for a vehicle axle, especially a rear axle, of a two-track vehicle, wherein the vehicle axle includes an axle differential, which can be connected at the input end to a primary drive machine and can be connected at the output end across flange shafts arranged on either side to vehicle wheels of the vehicle axle, wherein the vehicle axle is associated with an additional drive machine and a shiftable superimposing gear, which can be shifted to a torque distribution gear in which a drive torque is generated by the additional drive machine, a torque distribution on the two vehicle wheels can be changed depending on the magnitude and direction of rotation of the drive torque, and shifting can be done to a hybrid mode in which the drive torque generated by the additional drive machine can be coupled to both flange shafts of the vehicle wheels.

20 Claims, 10 Drawing Sheets

(52) U.S. Cl.
CPC ....... *B60Y 2200/92* (2013.01); *B60Y 2300/82* (2013.01); *B60Y 2400/73* (2013.01); *F16H 2048/364* (2013.01); *F16H 2048/368* (2013.01)

(56) References Cited

U.S. PATENT DOCUMENTS

| | | | | |
|---|---|---|---|---|
| 2016/0003337 A1* | 1/2016 | Smetana | ................ | F16H 48/05 475/5 |
| 2020/0247237 A1* | 8/2020 | Pinschmidt | .............. | B60K 6/52 |
| 2020/0262289 A1* | 8/2020 | Pinschmidt | .............. | B60K 6/24 |
| 2020/0276897 A1* | 9/2020 | Pinschmidt | .............. | F16H 48/36 |
| 2020/0317041 A1* | 10/2020 | Pinschmidt | .............. | B60K 6/48 |

FOREIGN PATENT DOCUMENTS

| | | | | |
|---|---|---|---|---|
| DE | 102010036240 A1 | 3/2012 | | |
| DE | 102011100816 A1 | 11/2012 | | |
| DE | 102012013375 A1 | 1/2014 | | |
| DE | 102013202381 A1 | 8/2014 | | |
| DE | 102013202382 A1 | 8/2014 | | |
| DE | 102013019906 A1 | 5/2015 | | |
| DE | 102013019907 A1 | 5/2015 | | |
| DE | 102014118026 A1 | 6/2015 | | |
| DE | 102014007940 A1 | 11/2015 | | |
| DE | 102014210549 A1 | 12/2015 | | |
| DE | 102014015793 A1 | 4/2016 | | |
| DE | 102015221190 A1 | 7/2016 | | |
| DE | 102017220167 B3 * | 3/2019 | ........... | B60K 17/046 |
| WO | WO-2019091746 A1 * | 5/2019 | ............. | F16H 48/11 |

OTHER PUBLICATIONS

Machine translation of DE 102015221190 A1. Google patents. (Year: 2015).*
English translation of the International Preliminary Report on Patentability dated May 19, 2020 in corresponding International Application No. PCT/EP2018/078617; 10 pages.
Examination Report dated Jul. 31, 2018 in corresponding German application No. 10 2017 220 168.1; 12 pages.
Examination Report dated May 20, 2019 in corresponding German application No. 10 2017 220 168.1; 4 pages.
Examination Report dated Jul. 22, 2019 in corresponding German application No. 10 2017 220 168.1; 8 pages.
International Search Report and Written Opinion dated Feb. 18, 2019 in corresponding application No. PCT/EP2018/078617; 25 pages.

* cited by examiner

DRIVE DEVICE FOR A VEHICLE AXLE OF A TWO-TRACK VEHICLE

FIELD

The disclosure relates to a drive device for a vehicle axle, especially a rear axle, of a two-track vehicle.

BACKGROUND

From DE 10 2014 015 793 A1 there is known a drive device of this kind for a vehicle rear axle comprising an axle differential, which can be connected at the input end to a primary drive machine (such as an internal combustion engine) and can be connected at the output end to flange shafts arranged on either side with vehicle wheels of the vehicle axle. The vehicle axle is associated with an additional drive machine (especially an electric motor) and a shiftable superimposing gear. The superimposing gear can be shifted to a torque distribution gear in which a drive torque is generated by the additional drive machine, depending on the magnitude and direction of rotation of which a torque distribution on the two vehicle wheels can be changed. Alternatively, the superimposing gear can be shifted to a hybrid mode in which the drive torque generated by the additional drive machine can be coupled to both flange shafts of the vehicle wheels in a shiftable hybrid gear, evenly distributed by the axle differential. In certain driving situations, for example when negotiating a curve, the driving performance when the torque distributions gear is engaged can be assisted by a torque redistribution (torque vectoring or cross lock function). Thus, when negotiating a curve, a drive torque when entering the curve can be shifted to the outer wheel of the vehicle on the curve (torque vectoring). Alternatively or additionally, when negotiating a curve, the drive torque when exiting the curve can be shifted to the inner wheel of the vehicle on the curve (cross lock function). On the other hand, a boost function can occur, for example, when hybrid mode is activated.

In the above DE 10 2014 015 793 A1, the superimposing gear comprises a total of three planetary gearings, which can be shifted by means of two brakes in order to provide the hybrid mode or the torque distribution mode, resulting in a design space-intensive arrangement on the whole.

SUMMARY

The problem which the invention proposes to solve is to provide a drive device for a vehicle axle of a two-track vehicle having reduced design space as compared to the prior art, and enabling a function expansion/reduction with simple means, namely, with less design space requirement and with enhanced driving dynamics.

The problem is solved by the features of Independent claim. Preferred modifications of the disclosure are disclosed in the dependent claims.

According to the characterizing passage of patent claim 1, the three planetary gearings in the superimposing gear are coupled together such that a load path with power branching is formed when the torque distribution gear is engaged or when a first hybrid gear is engaged, in which all three of the planetary gearings are integrated. On the contrary, when a second hybrid gear is engaged, a load path is formed without power branching, in which only precisely one of the planetary gearings is integrated. In this way, different gear ratios can be easily realized in the first hybrid gear and in the second hybrid gear. In an alternative embodiment (FIG. 10), precisely only two planetary gearings PG3, PG1 can be incorporated in the second hybrid gear.

In one technical embodiment, the three planetary gearings can be arranged in a row, coaxially to the flange shaft. The first planetary gearing at the input end can be rotationally fixed by its input element, especially a sun gear, to a transmission input shaft driven by the additional drive machine. Furthermore, the first planetary gearing at the input end can be rotationally fixed by its output element, especially a planet carrier carrying planet gears, to a transmission output shaft, which is coupled in driving manner to the driving end of the axle differential (for a differential drive). The reaction element of the first planetary gearing at the input end, especially a radially outer ring gear meshing with the planet gears, can be locked by a shift element SE2 on the gearbox housing or released from it, depending on the shift position of the shift element SE2.

In this case, in the second hybrid gear H2, the ring gear can be locked by the shift element SE2 on the gearbox housing, so that a drive torque flow or load path is produced without power branching from the additional drive machine (electric machine) across the first planetary gearing at the input end to the driving end of the axle differential, while the second and third planetary gearing are decoupled from the load path.

In regard to a torque transformation, it is preferable when the additional drive machine is coupled across a reduction stage to the transmission input shaft. For design space reasons, the additional drive machine can preferably be arranged axially parallel to the flange shaft, and the reduction stage can be for example a single-stage spur gear.

In terms of a further package optimization, it is preferable when the transmission input shaft, the transmission output shaft and the transmission-side flange shaft are arranged nested coaxially to each other. In this case, it is preferable in terms of an easy shifting when the transmission input shaft is realized as an outer hollow shaft, in which the transmission output shaft is situated as an inner hollow shaft, through which the transmission-side flange shaft extends as a solid shaft.

In one specific design variant, the ring gear of the first planetary gearing at the input end and a ring gear of the third planetary gearing can be rotationally fixed on a common, radially outer ring gear shaft. The radially outer ring gear shaft can be locked by the already mentioned shift element SE2 on the gearbox housing.

The ring gear of the third planetary gearing can mesh with planet gears which are rotatably mounted on a planet carrier and which mesh in turn with a radially inner sun gear, which can be rotationally fixed as a reaction element to the gearbox housing.

Furthermore, the third planetary gearing and the middle second planetary gearing can be coupled together in driving manner across an intermediate shaft. The intermediate shaft may carry, in rotationally fixed manner, both a sun gear of the second planetary gearing and a connecting flange, which is attached to the planet gear carrier of the third planetary gearing. In the second planetary gearing, the sun gear rotationally fixed to the intermediate shaft can mesh with planet gears, which are rotatably mounted on a planet gear carrier and which in turn mesh with a radially outer ring gear. Preferably, the ring gear of the second planetary gearing can be coupled by a radially inner ring gear shaft to the planet gear carrier of the first planetary gearing. Furthermore, the planet gear carrier of the second planetary gearing can be engaged, especially across a second inner hollow shaft, by means of a shift element SE1, either from its neutral position to the first hybrid gear H1 or from its neutral position N to the torque distribution gear TV.

In large series production, different variants of a vehicle type are often produced, meeting different demands on the drive device. Accordingly, it is advantageous in terms of production engineering for the superimposing gear to be easily adapted to the respective vehicle variant in terms of a function expansion or reduction. Accordingly, it is advantageous in terms of production engineering for the superimposing gear to have a transmission structure in which individual modules can be omitted, added or modified in a simple design process. This is accomplished according to the invention as follows: the additional drive machine along with the reduction gearing, the first and third planetary gearing, the shift element SE2 and the shift element SE1 are arranged in this sequence as modules in succession in the vehicle transverse direction from the inside of the vehicle to the outside of the vehicle. By omitting, adding or modifying one or more of these modules, the superimposing gear can be easily adapted to different vehicle variants.

In the alternative second embodiment (FIG. 10)—by contrast with the above first embodiment—precisely two planetary gearings PG3, PG1 can be incorporated in the second hybrid gear H2.

In the second embodiment, the transmission input shaft can no longer be positioned at the vehicle internal side of the superimposing gear, but instead at its vehicle outer side, together with the shift elements SE1, SE2. Accordingly, the sun gear of the vehicle-internal first planetary gearing PG1 can no longer be coupled in driving manner to the additional drive machine, but instead it is fixed to the housing. On the contrary, the third planetary gearing PG3 can be rotationally fixed by its sun gear to the transmission input shaft, driven by the additional drive machine. The transmission input shaft and the transmission output shaft in the second embodiment can no longer be nested coaxially in each other, but instead are arranged alongside each other as hollow shafts in axial alignment. Furthermore, when the hybrid gear H2 is engaged, the planet gear carrier of the third planetary gearing PG3 can be locked by means of the shift element SE2 to the gearbox housing or be released from it.

In the above second embodiment, the following load path is produced with the first hybrid gear H1 is engaged: accordingly, the planet gear carrier of the second planetary gearing PG2 is rotationally fixed by the inner hollow shaft to the gearbox housing. In this way, the driving torque generated by the additional drive machine will be channeled by a load path to the sun gear of the third planetary gearing PG3. At the planet gear carrier of the third planetary gearing PG3 there occurs a power branching to form a first partial path and a second partial path. The first partial path goes from the planet gear carrier across the connecting flange and the intermediate shaft to the second planetary gearing PG2 and from here across the inner ring gear shaft to the driving flange and further across the transmission output shaft to the differential housing. The second partial path goes from the planet gear carrier across the planet gears and the ring gear of the third planetary gearing PG3 and across the ring gear shaft to the first planetary gearing PG1. In its planet gear carrier, a power addition occurs, in which the second load path is added to the first load path.

The following load path occurs when the second hybrid gear H2 is engaged: accordingly, the planet gear carrier of the third planetary gearing PG3 is fixed by means of the second shift element SE2 to the housing. In this way, the load path is channeled at first from the additional drive machine to the sun gear of the third planetary gearing PG3 and then, with no power branching, it goes entirely across the planet gears, the ring gear, the ring gear shaft to the first planetary gearing PG1. From its planet gear carrier, the load path is taken on across the transmission output shaft to the differential housing.

When the torque distribution gear TV is engaged, the planet gear carrier of the middle, second planetary gearing PG2 is coupled in driving manner across the second inner hollow shaft and across the engaged first shift element SE1 to the driving flange of the transmission-side flange shaft. The direction of turning and the magnitude of the [torque] of the additional drive machine is designed such that a torque is picked off from the transmission-side flange shaft and channeled across the second inner hollow shaft to the planet gear carrier of the second planetary gearing PG2. Here, a power branching occurs to form a first partial path and a second partial path. The first partial path goes across the planet gears and the ring gear of the second planetary gearing PG2 and across the radially inner ring gear shaft to the driving flange. The second partial path goes from the planet gear carrier of the second planetary gearing PG2 across its sun gear and the intermediate shaft to the third planetary gearing PG3 (the input element is the planet gear carrier of the third planetary gearing PG3) and across its ring gear (the output element) to the first planetary gearing PG1. From here, the second load path goes across the planet gear carrier of the first planetary gearing PG1 to the driving flange. In the driving flange a power addition occurs, in which the two partial paths are added together.

Exemplary embodiments of the invention are described below with the aid of the enclosed figures.

BRIEF DESCRIPTION OF THE DRAWING

There are shown.

DETAILED DESCRIPTION

Figure 1:
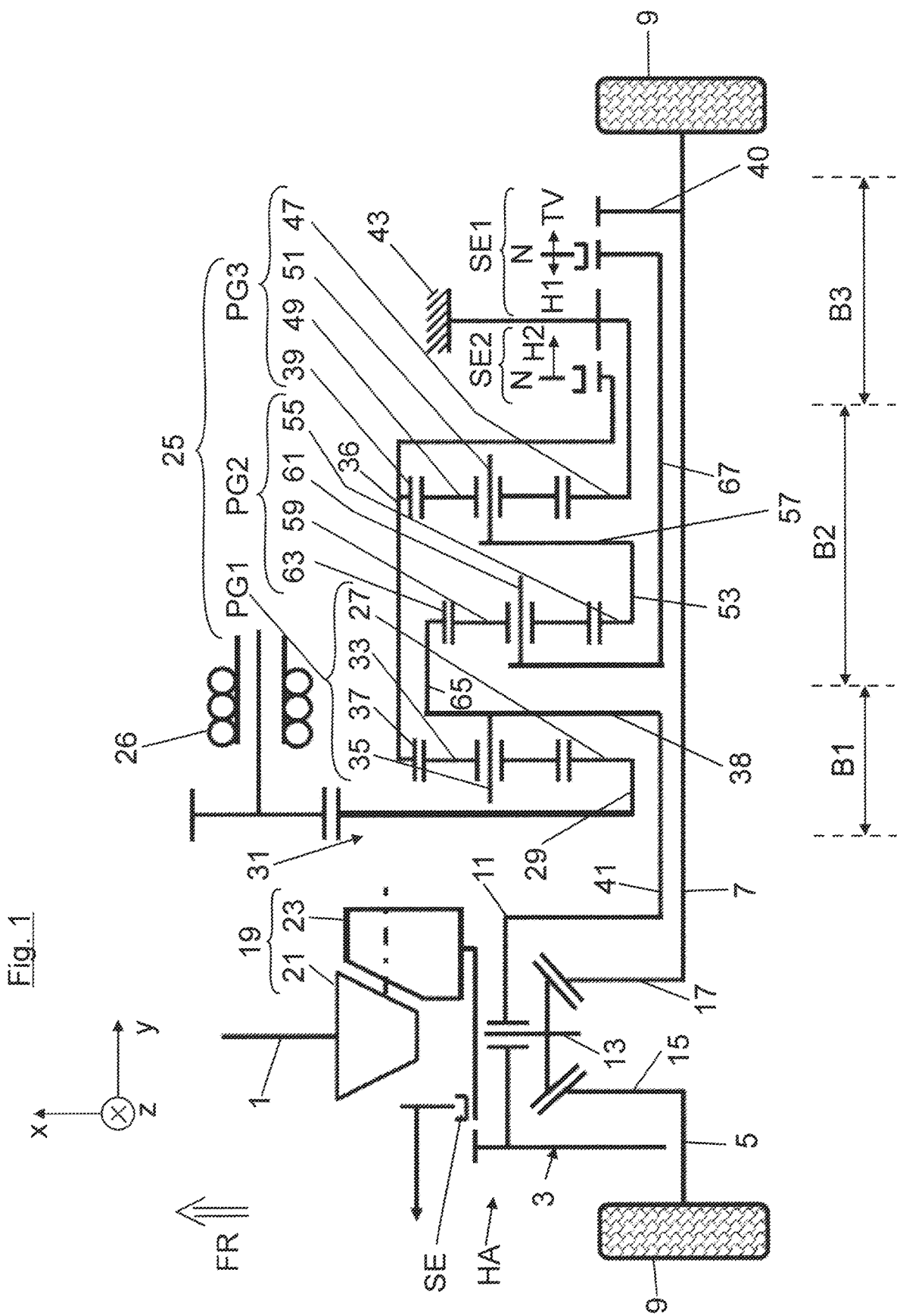
FIG. 1, in a schematic representation, a drive device for a vehicle rear axle of a two-track vehicle in a basic configuration.

FIG. 1 shows, roughly schematically, a gearing structure of a drive device for a vehicle rear axle HA of a two-track vehicle. The drive device shown in FIG. 1 may be part of an all-wheel drive, in which a front-end internal combustion engine (not shown) as the primary drive machine drives the front wheels of the vehicle across a transmission as well as a central differential and a front axle differential. The central differential can be connected across a Cardan shaft 1 to the input end of a rear axle differential 3. The rear axle differential 3 is coupled at its output, in driving manner, to the rear wheels 9 of the vehicle's rear axle HA across flange shafts 5, 7 arranged on both sides. In FIG. 1, the rear axle differential 3 is an ordinary bevel gear differential, comprising a drive-side differential housing 11, on which two mutually coaxial and oppositely spaced differential bevel gears 13 (only one differential bevel gear 13 being shown in FIG. 1) are rotatably mounted, as well as first and second driving bevel gears 15, 17, which are arranged at right angles to the differential bevel gears 13 and are coaxially spaced apart from each other, meshing with the two differential bevel gears 13. The first driving bevel gear 15 is rotationally fixed to the left flange shaft 5 in FIG. 1, while the second driving bevel gear 17 is rotationally fixed to the right flange shaft 7 in FIG. 1.

In FIG. 1, the Cardan shaft 1 can be coupled in driving manner across a bevel gearing 19 to the differential housing 11, comprising a bevel gear 21 mounted on the Cardan shaft 1 and meshing with a crown gear 23. Between the bevel gearing 19 and the differential housing 11 there is interposed a shift element SE, which can be used to disengage the rear axle HA from the driving by the Cardan shaft 1.

As is further seen in FIG. 1, the rear axle HA comprises a superimposing gear 25 and an electric machine 26. The superimposing gear 25 can be operated in a hybrid mode or in a torque distribution mode (that is, electronic torque vectoring or cross lock function), as will be explained later on. In the hybrid mode, a drive torque M generated by the electric machine 26 is engaged across the superimposing gear 25 and across the rear axle differential 3 and is evenly distributed on the two flange shafts 5, 7. The hybrid mode can be implemented as a pure electric motor or in a combination of the electric machine 26 with the internal combustion engine (for example, for a boost function).

In the torque distribution mode, the drive torque generated by the electric machine 26 is taken not only to the driving end (that is, the differential housing 11) of the axle differential 3, but also is coupled across the superimposing gear 25 directly to the transmission-side flange shaft 7, in order to change a torque distribution on the two rear wheels 9. The channeling to the transmission-side flange shaft 7 occurs across a torque distribution output flange 40, mounted on the transmission-side flange shaft 7. The torque distribution between the vehicle wheels 9 will occur according to the magnitude and the direction of turning of the drive torque M generated by the electric machine 26.

In the following, the gearing structure of the superimposing gear 25 will be explained with the aid of FIG. 1: accordingly, the superimposing gear 25 comprises a first planetary gearing PG1, a second planetary gearing PG2, and a third planetary gearing PG3, which are arranged immediately next to each other in the vehicle transverse direction y and coaxially oriented on the flange shaft 7 at the transmission side. The interior first planetary gearing PG1 is rotationally fixed by its sun gear 27 to a transmission input shaft 29, which is driven by the electric machine 26. As its output element, the interior first planetary gearing PG1 has a planet carrier 35, carrying planet gears 33, which is attached by a driving flange 38 to a transmission output shaft 41. This, in turn, is rotationally fixed to the differential housing 11 of the axle differential 3. As a reaction element, the interior first planetary gearing PG1 has a ring gear 37, meshing with the planet gears 33.

The transmission input shaft 29 is connected across a single-stage spur gear 31, acting as a reducing gear, to the electric machine 26, which is positioned axially parallel to the flange shafts 5, 7. Furthermore, the transmission input shaft 29, the transmission output shaft 41 and the transmission-side flange shaft 7 are arranged coaxially to and nested with each other. The transmission input shaft 29 is realized as an outer hollow shaft, in which the transmission output shaft 41 is arranged as an inner hollow shaft, through which the transmission-side flange shaft 7 extends.

In FIG. 1, both the ring gear 37 of the vehicle-internal first planetary gearing PG1 and a ring gear 39 of the vehicle outer third planetary gearing PG3 are rotationally fixed to a common radially outer ring gear shaft 36. The radially outer ring gear shaft 36 reaches across the middle planetary gearing PG2 and can be locked at its vehicle-outer end by means of a shift element SE2 to a gearbox housing wand 43, and this when the hybrid gear H2 is engaged. In the figure, the shift element SE2 is in its neutral position, in which the radially outer ring gear shaft 36 is released from the gearbox housing wall 43.

In the vehicle-outer third planetary gearing PG3, the ring gear 39 meshes with planet gears 49, which are rotatably mounted on a planet gear carrier 51 and mesh in turn with a sun gear 47, which is rotationally fixed as a reaction element to the gearbox housing 43. The third planetary gearing PG3, located outward from the vehicle in the vehicle transverse direction y, and the middle second planetary gearing PG2 are coupled together by an intermediate shaft 53. The intermediate shaft 53 carries both a sun gear 55 of the second planetary gearing PG2 and a connecting flange 57, which is rotationally fixed to the planet gear carrier 51 of the third planetary gearing PG3.

In the middle second planetary gearing PG2, the sun gear 55 meshes with planet gears 59, which are rotatably mounted on a planet gear carrier 61 and which mesh in turn with a radially outer ring gear 63. The ring gear 63 of the second planetary gearing PG2 is coupled across a radially inner ring gear shaft 65 to the planet gear carrier 35 of the first planetary gearing PG 1. Furthermore, the planet gear carrier 61 of the second planetary gearing PG2 can be engaged across a second inner hollow shaft 67 by means of a shift element SE1. In FIG. 1, the shift element SE1 is shown in its neutral position N, from which it can be shifted in the axial direction either to a first hybrid gear H1 or in the opposite direction to a torque distribution gear TV.

In order to explain the functioning of the drive device, a driving situation will be described with the aid of FIG. 2, in which, in a first hybrid mode, the first hybrid gear H1, designed for example as a starting gear, is engaged by means of the shift element SE1. Accordingly, the planet carrier 61 of the second planetary gearing PG2 will be rotationally fixed across the inner hollow shaft 67 to the gearbox housing 43. In this way, the driving torque M generated by the electric machine 26 is channeled by a load path to the sun gear 27 of the first planetary gearing PG1. At the planet gears 33 of the first planetary gearing PG1 there occurs a power branching, during which the load path is branched to form a first partial torque $M_1$ and a second partial torque $M_2$. The first partial torque $M_1$ is channeled directly across the driving flange 38 and the transmission output shaft 41 to the differential housing 11. The second partial torque $M_2$ is channeled on the contrary across the ring gear 37 of the first planetary gearing PG1 and the outer hollow shaft 36 to the third planetary gearing PG3 and from here it is channeled across the planet gear carrier 51 (acting as an output element), the connecting flange 57, the intermediate shaft 53 to the second planetary gearing PG2. From here, the partial torque $M_2$ is further channeled (under torque boosting) across the ring gear 63 of the second planetary gearing PG2 and across the inner ring gear shaft 65 to the driving flange 38 of the first planetary gearing PG1 and added to the partial torque $M_1$. In this case, the second planetary gearing PG2 acts in particular as a booster gear, with which the partial torque $M_2$ is increased.

Figure 3:
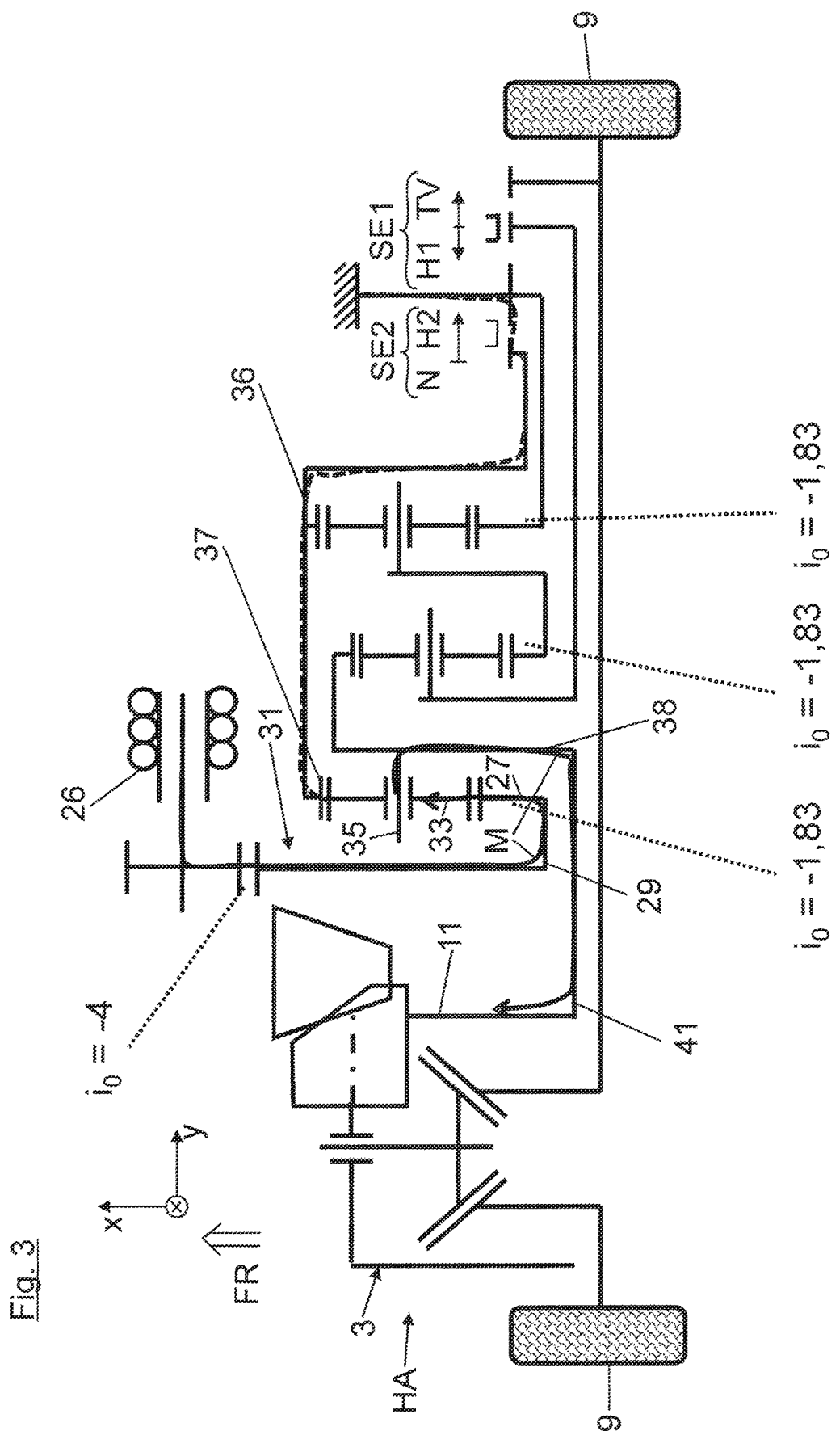
FIG. 3, view corresponding to FIG. 1 with highlighted drive torque flow with the second hybrid gear engaged.

FIG. 3 shows a further driving situation in which, in a second hybrid mode, the second hybrid gear H2 is engaged. In the present instance, the second hybrid gear is designed for example as a CO2-optimized starting gear, which can be engaged at higher driving speeds. When the second hybrid gear H2 is engaged, the outer ring gear shaft 36 is attached firmly to the gearbox housing 43 by means of the shift element SE2, engaged in the second hybrid gear H2. In this way, the driving torque M generated by the electric machine 26 is once again channeled at first to the sun gear 27 of the first planetary gearing PG1 and then it is channeled without power branching entirely across the planet gears 33, the planet gear carrier 35, the driving flange 38 and the transmission output shaft 41 to the differential housing 11.

Figure 2:
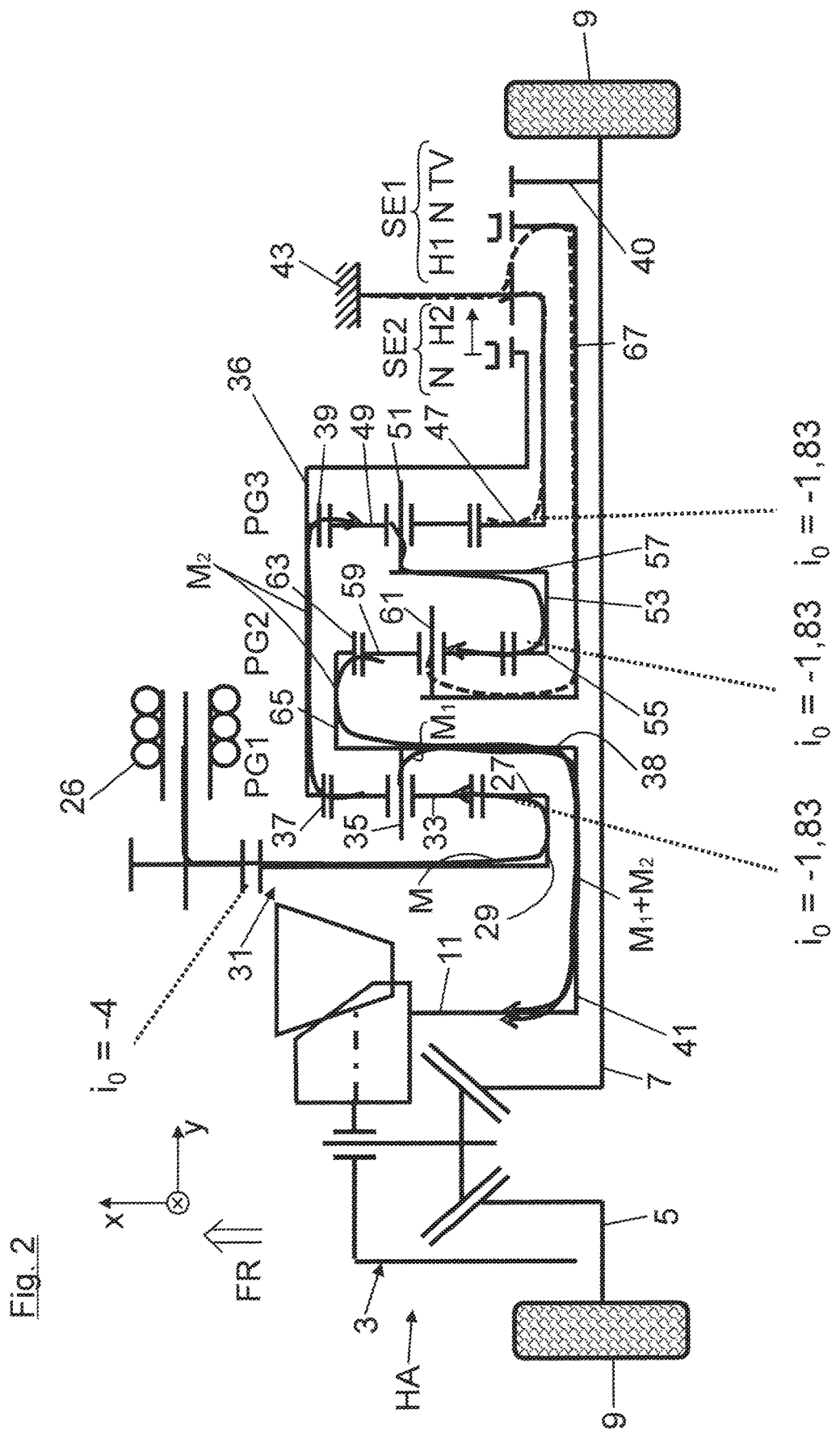
FIG. 2, view corresponding to FIG. 1 with highlighted drive torque flow with the first hybrid gear engaged.
Figure 4:
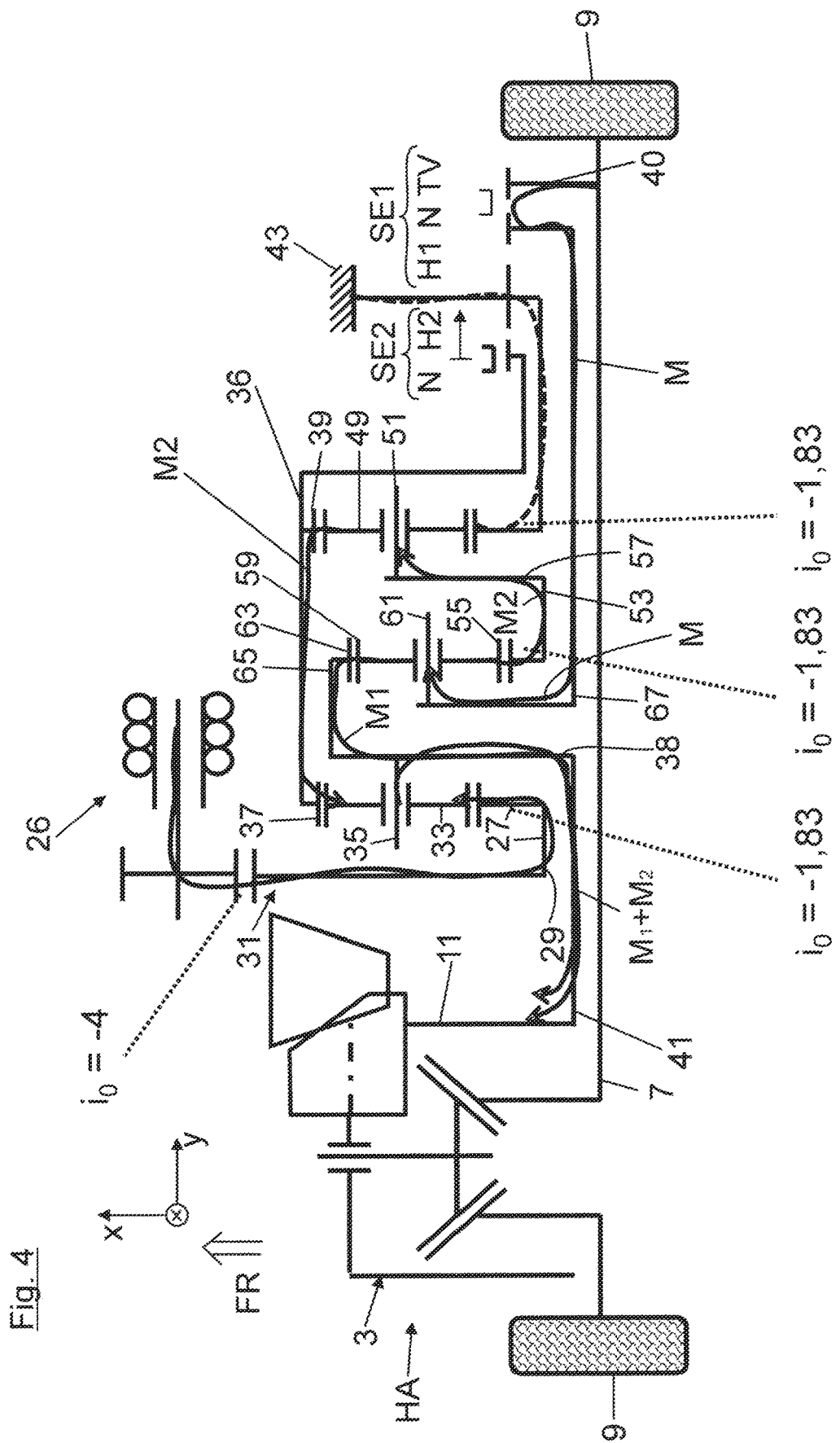
FIG. 4, view corresponding to FIG. 1 with highlighted drive torque flow with the torque distribution gear engaged.

FIG. 4, by contrast with FIGS. 2 and 3, shows the superimposing gear 25 operating not in the hybrid mode, but rather in the torque distribution mode. This mode is activated, for example, when negotiating a curve, in order to achieve a torque difference between the flange shafts 5, 7. In the torque distribution mode, the planet gear carrier 61 of the middle, second planetary gearing PG2 is coupled in driving manner across the second inner hollow shaft 67 via the first shift element SE1 to the driving flange 40 of the transmission-side flange shaft 7.

The direction of turning and the magnitude of the driving torque generated by the electric machine 26 is designed such that a torque M is picked off from the transmission-side flange shaft 7 in FIG. 4 and channeled across the inner hollow shaft 67 to the planet gear carrier 61 of the second planetary gearing PG2. Here, a power branching occurs, during which a first partial torque $M_1$ is channeled across the planet gears 49, the ring gear 63 and the radially inner ring gear shaft 65 to the driving flange 38. A second partial torque $M_2$ is channeled from the planet gear carrier 61 of the second planetary gearing PG2 across its sun gear 55 and the intermediate shaft 53 to the third planetary gearing PG3 (the input element is the planet gear carrier 51 of the third planetary gearing PG3) and across its ring gear 39 (the output element) to the first planetary gearing PG1. From here, the second partial torque $M_2$ is further channeled across the planet gear carrier 35 of the first planetary gearing PG1 to the driving flange 38. In the driving flange 38, the second partial torque $M_2$ is added to the first partial torque $M_1$ and channeled across the transmission output shaft 41 to the axle differential 3. In this case, in particular, the second planetary gearing PG2 is designed as a booster gear, with which the partial torque $M_2$ is increased.

In the following, the advantages of the drive device according to the invention are summarized as follows: thus, according to the invention, a single spur gear stage 31 is used in combination with the second planetary gearing PG2 for the transmission ratio of the electric machine 26. Furthermore, a conventional bevel gearing differential 3 can be used. The planetary gearings PG1, PG2, PG3 can be designed with the same stationary gear ratios. Moreover, if any given module is omitted (first gear, second gear, or TV function), no planet stage is eliminated. Only the corresponding shift element will be eliminated. In a transmission design with (only) the second hybrid gear H2, the planetary gearings PG2 and PG3 of the superimposing gear can be entirely omitted, while the planetary gearing PG1 is required for the gear H1. On the contrary, in the basic configuration (that is, the maximum outfitting stage), only two brakes and one clutch are used in total as shift elements. The direction of turning of the electric machine 26 does not change between the first and second hybrid gears. Furthermore, the hybrid operation occurs with power branching in the first hybrid gear H1 (no reactive power). The efficiencies are high in the hybrid gears H1, H2. The efficiency is very high in the second hybrid gear H2.

Figure 5:
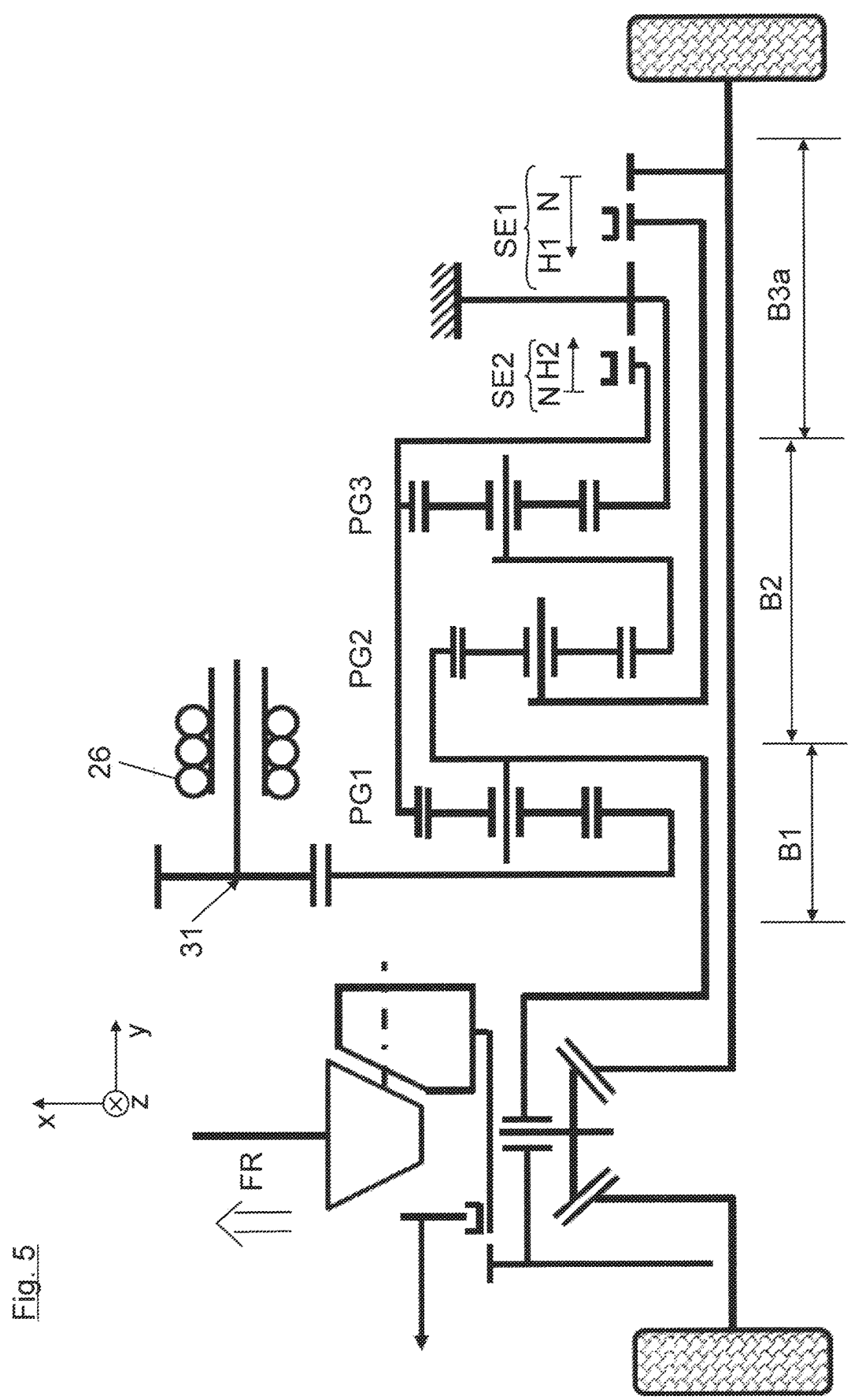
FIG. 5, view of the drive device for further vehicle variants with a reduced functional configuration as compared to FIG. 1.

As is further seen from FIG. 1, the electric machine 26 along with the reduction gearing 31, the three planetary gearings PG1, PG2, PG3 and the shift elements SE2 and SE1 are arranged in succession as the indicated modules B1 to B4 in this sequence from the interior of the vehicle to the outside of the vehicle in the vehicle transverse direction y. In the course of a series production, the superimposing gear 25 can be adapted each time to the vehicle variant being manufactured by omitting, adding and/or modifying one or more of these modules B1 to B4. Thus, the drive device shown in FIG. 1 represents a basic configuration in which all of the above modules B1 to B4 have been installed. On the contrary, FIG. 5 shows a vehicle variant in which a new modified module B3a is used in place of the module B3, where the driving flange 40 has been omitted and thus the torque distribution gear TV can no longer be engaged.

Figure 6:
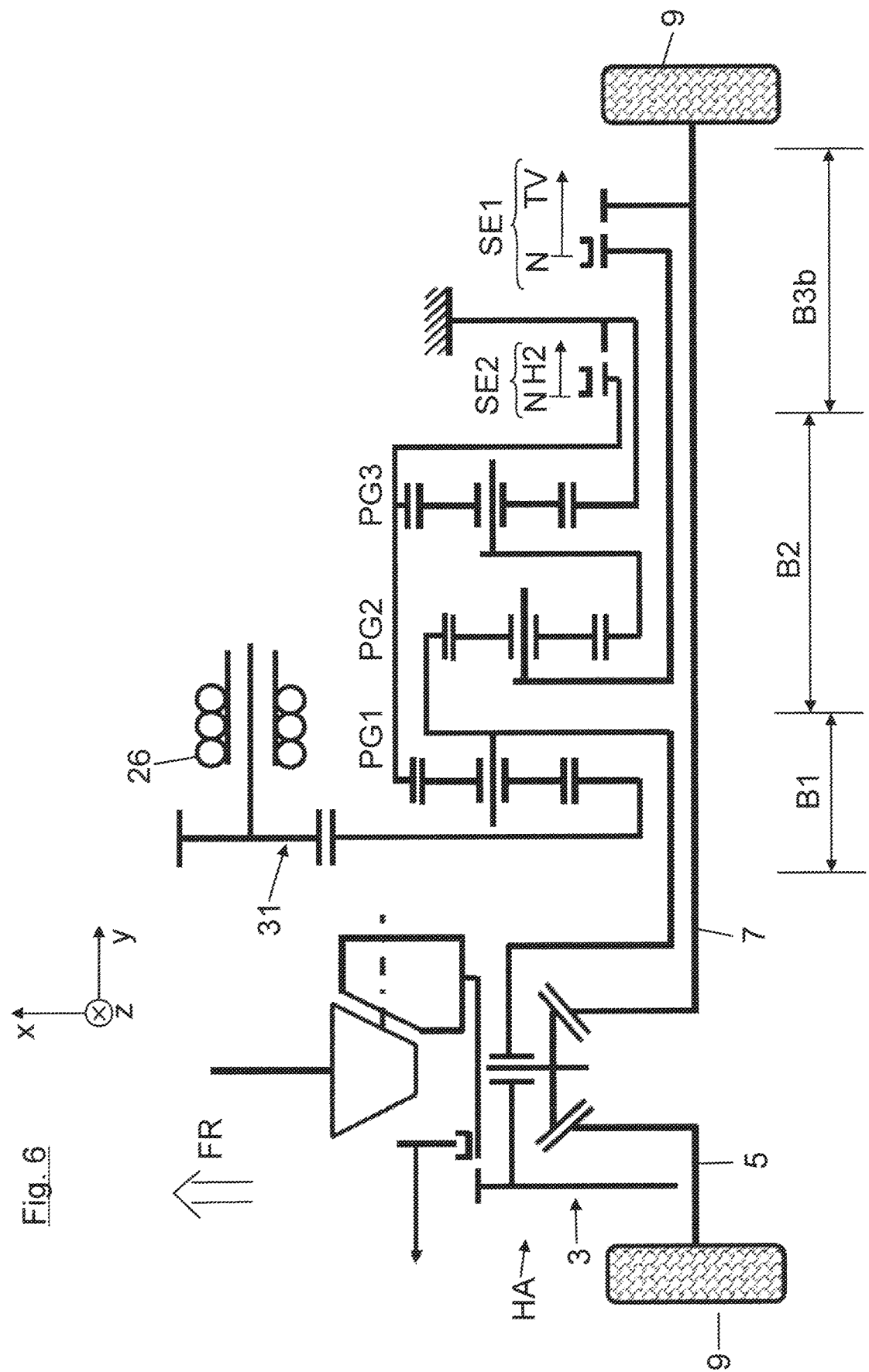
FIG. 6, view of the drive device for further vehicle variants with a reduced functional configuration as compared to FIG. 1.

In FIG. 6, the drive device is shown in another vehicle variant, in which a new modified module B3b is used in place of the module B3, where the possibility of shifting to the first hybrid gear H1 has been eliminated. Accordingly, in FIG. 6 the shift element SE1 can only be shifted from its neutral position N to the torque distribution gear TV.

Figure 7:
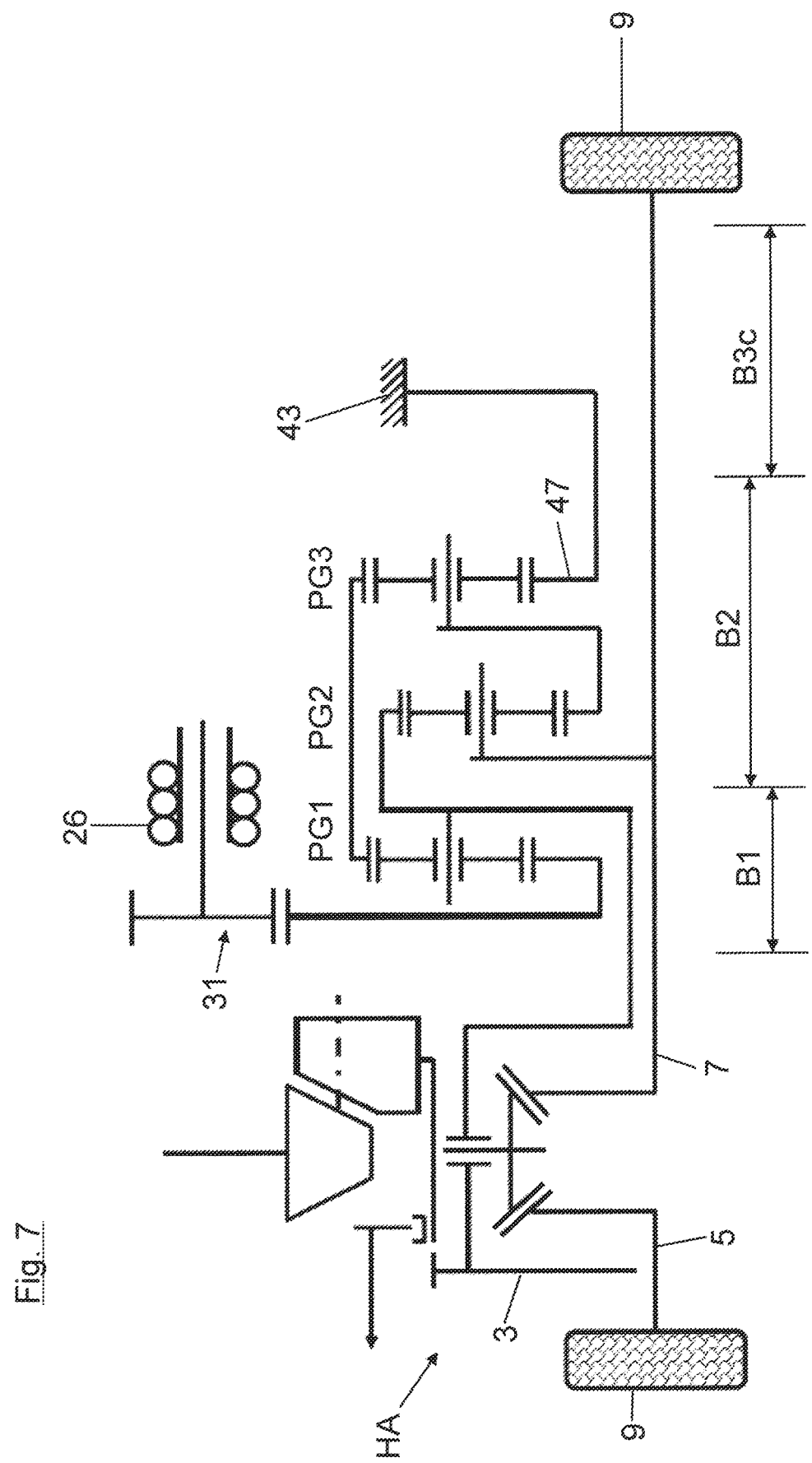
FIG. 7, view of the drive device for further vehicle variants with a reduced functional configuration as compared to FIG. 1.

In FIG. 7, a drive device is shown in another vehicle variant, in which a new modified module B3c is used in place of the module B3 (FIG. 1), where all possibilities of shifting have been eliminated, and only a fixed attachment of the sun gear 47 of the third planetary gearing PG3 to the gearbox housing 43 is provided.

Figure 8:
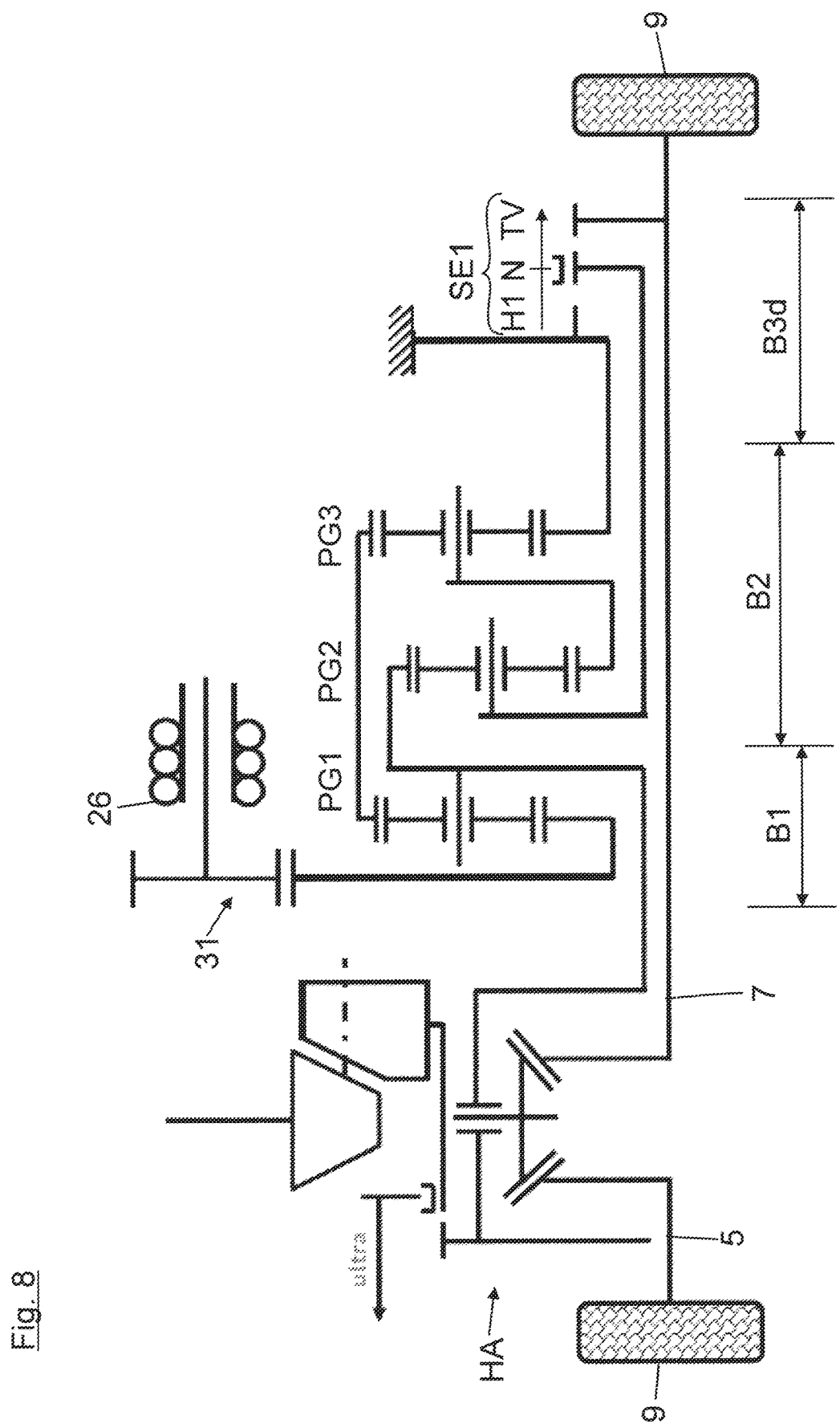
FIG. 8, view of the drive device for further vehicle variants with a reduced functional configuration as compared to FIG. 1.

In FIG. 8, a drive device is shown for another vehicle variant, in which a new modified module B3d is used in place of the module B3, where the possibility of shifting to the second hybrid gear H2 has been eliminated and only the first hybrid gear and the torque distribution gear TV can be engaged.

Figure 9:
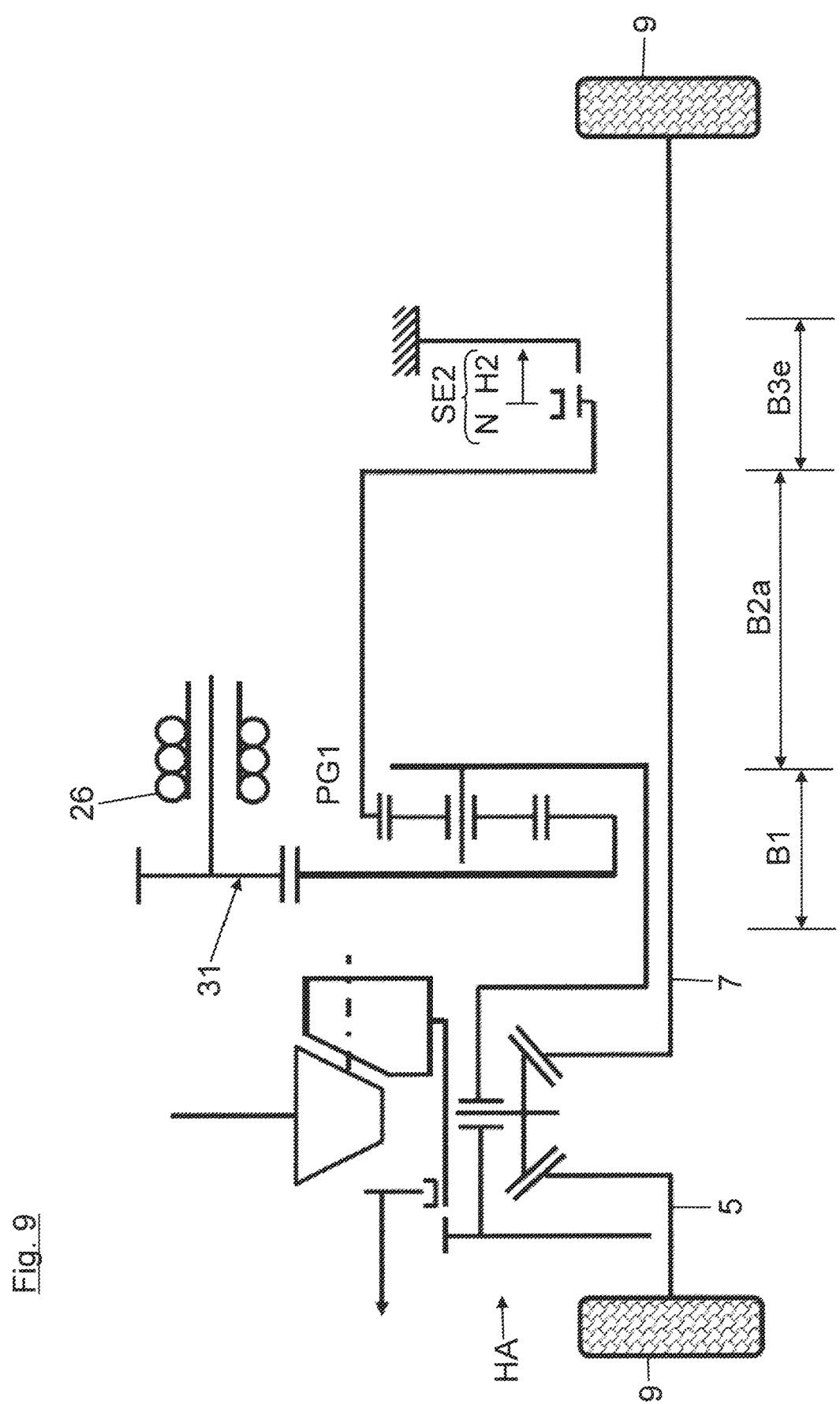
FIG. 9, view of the drive device for further vehicle variants with a reduced functional configuration as compared to FIG. 1.

In FIG. 9, a drive device is shown for another vehicle variant, in which a new module B2a is used in place of the module B2, where the two planetary gearings PG2 and PG3 have been eliminated. Accordingly, a new module B3e is used in place of the module B3, where only the second hybrid gear H2 can be engaged.

Figure 10:
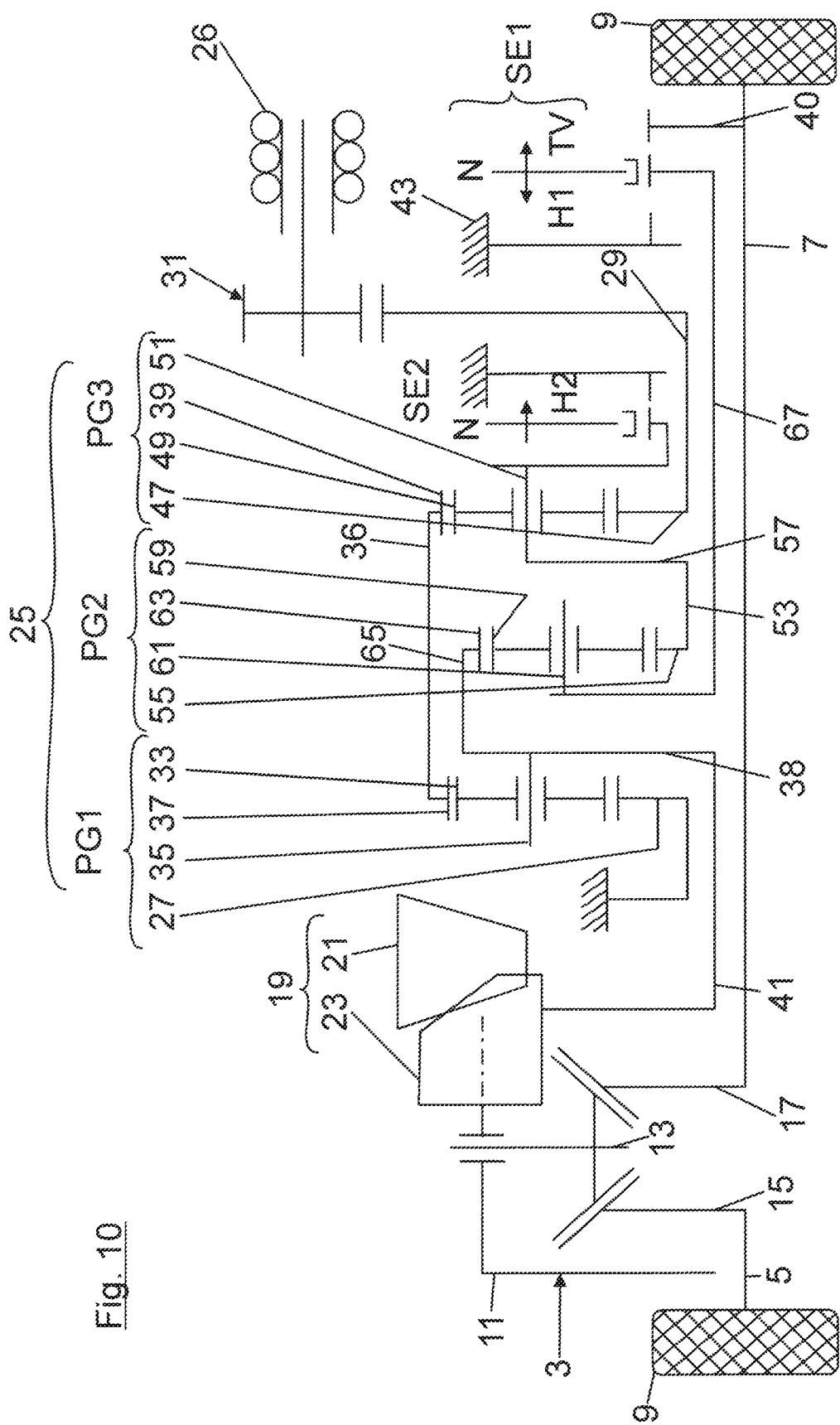
FIG. 10, a view corresponding to FIG. 1 of a second exemplary embodiment.

FIG. 10 shows a second exemplary embodiment, whose construction and mode of functioning are basically identical to the construction and mode of functioning of the first exemplary embodiment. Therefore, reference is made to the previous description and only the differences from the first exemplary embodiment will be presented in the following.

By contrast with the first exemplary embodiment, in FIG. 10 the transmission input shaft 29 is no longer positioned at the vehicle internal side of the superimposing gear 25, but instead at its vehicle outer side, together with the shift elements SE1, SE2. Accordingly, in FIG. 10, the sun gear 27 of the vehicle-internal first planetary gearing PG1 is no longer coupled in driving manner to the electric machine 26, but instead it is fixed to the housing. Accordingly, in FIG. 10, the third planetary gearing PG3 is rotationally fixed by its sun gear 47 to the transmission input shaft 29, driven by the electric machine 26.

Furthermore, in FIG. 10, the transmission input shaft 29 and the transmission output shaft 41 are no longer nested coaxially in each other, but instead are arranged alongside each other as hollow shafts in axial alignment.

Furthermore, in FIG. 10 the radially outer ring gear shaft 36 can no longer be locked by means of the shift element SE2 on the gearbox housing 43 (when the hybrid gear H2 is engaged). Instead, in FIG. 10, the planet gear carrier 51 of the third planetary gearing PG3 can be locked by means of the shift element SE2 to the gearbox housing 43 (when the hybrid gear H2 is engaged).

In order to explain the mode of functioning of the drive device, in the following the load path is described when the first hybrid gear H1 is engaged, which may be designed for example as a starting gear. Accordingly, the planet gear carrier 61 of the second planetary gearing PG2 is rotationally fixed by the inner hollow shaft 67 to the gearbox housing 43. In this way, the driving torque generated by the electric machine 26 will be channeled by a load path to the sun gear 47 of the third planetary gearing PG3. At the planet gear carrier 51 of the third planetary gearing PG3 there occurs a power branching to form a first partial path and a second partial path. The first partial path goes from the planet gear carrier 51 across the connecting flange 57 and the intermediate shaft 53 to the second planetary gearing PG2 and from here across the inner ring gear shaft 65 to the driving flange 38 and further across the transmission output shaft 41 to the differential housing 11. The second partial path goes from the planet gear carrier 51 across the planet gears 49 and the ring gear 39 of the third planetary gearing PG3 and across the ring gear shaft 36 to the first planetary gearing PG1. In its planet gear carrier 35, a power addition occurs, in which the second load path is added to the first load path.

The following load path occurs when the second hybrid gear H2 is engaged: accordingly, the planet gear carrier 51 of the third planetary gearing PG3 is fixed by means of the second shift element SE2 to the housing. In this way, the load path is channeled at first from the electric machine 26 to the sun gear 47 of the third planetary gearing PG3 and then, with no power branching, it goes entirely across the planet gears 49, the ring gear 39, the ring gear shaft 36 to the first planetary gearing PG1. From its planet gear carrier 35, the load path is taken on across the transmission output shaft 41 to the differential housing 11.

When the torque distribution gear TV is engaged, the planet gear carrier 61 of the middle, second planetary gearing PG2 is coupled in driving manner across the second inner hollow shaft 67 and across the engaged first shift element SE1 to the driving flange 40 of the transmission-side flange shaft 7. The direction of turning and the magnitude of the driving torque generated by the electric machine 26 is designed such that a torque M is picked off from the transmission-side flange shaft 7 in FIG. 10 and channeled across the second inner hollow shaft 67 to the planet gear carrier 61 of the second planetary gearing PG2. Here, a power branching occurs to form a first partial path and a second partial path. The first partial path goes across the planet gears 59 and the ring gear 63 of the second planetary gearing PG2 and across the radially inner ring gear shaft 65 to the driving flange 38. The second partial path goes from the planet gear carrier 61 of the second planetary gearing PG2 across its sun gear 55 and the intermediate shaft 53 to the third planetary gearing PG3 (the input element is the planet gear carrier 51 of the third planetary gearing PG3) and across its ring gear 39 (the output element) to the first planetary gearing PG1. From here, the second load path goes across the planet gear carrier 35 of the first planetary gearing PG1 to the driving flange 38. In the driving flange 38 a power addition occurs, in which the two partial paths are added together.

The invention claimed is:

1. A drive device for a vehicle axle of a two-track vehicle, wherein the vehicle axle comprises:
   an axle differential, which is connectable at an input end to a primary drive machine and connectable at an output end across flange shafts arranged on either side to vehicle wheels of the vehicle axle,
   wherein the vehicle axle is connectable to an additional drive machine and a shiftable superimposing gear, which is shiftable to a torque distribution mode and to a hybrid mode, the hybrid mode comprising a first hybrid mode and a second hybrid mode,
   wherein, in the torque distribution mode, a drive torque is generated by the additional drive machine and a torque distribution on the two vehicle wheels is changeable depending on a magnitude and direction of rotation of the drive torque,
   wherein, in the hybrid mode, the drive torque generated by the additional drive machine is coupled to both flange shafts of the vehicle wheels and evenly distributed by the axle differential,
   wherein the superimposing gear further comprises three planetary gearings which are coupled together,
   wherein a load path incorporating all three of the planetary gearings is formed in the superimposing gear when the torque distribution mode is engaged and when the first hybrid mode is engaged,
   wherein a load path incorporating exactly one of the three or exactly two of the three planetary gearings is formed in the superimposing gear when the second hybrid mode is engaged, and
   wherein a reaction element is lockable or release-able by a second shift element on a gearbox housing.

2. The drive device according to claim 1, wherein the three planetary gearings are arranged in a row, coaxially to the flange shaft
   wherein a first planetary gearing at the input end is rotationally fixed by an input element to a transmission input shaft driven by the additional drive machine, and is connected by an output element to a transmission output shaft, which is coupled in driving manner to a driving end of the axle differential.

3. The drive device according to claim 2, wherein, in the second hybrid mode, the reaction element of the first planetary gearing is locked by the second shift element on the gearbox housing, so that a load path or driving torque flow is produced from the additional drive machine across the first planetary gearing at the input end to the driving end of the axle differential.

4. The drive device according to claim 1, wherein the additional drive machine is coupled across a reduction stage for a torque transformation to the transmission input shaft; and
   wherein the additional drive machine is arranged axially parallel to the flange shaft.

5. The drive device according to claim 2, wherein the transmission input shaft, the transmission output shaft and the transmission-side flange shaft are arranged nested coaxially to each other, and wherein the transmission input shaft is formed as an outer hollow shaft, in which the transmission output shaft is arranged as an inner hollow shaft, through which the transmission-side flange shaft extends.

6. The drive device according to claim 2, wherein the reaction element of the first planetary gearing at the input end and a ring gear of the third planetary gearing are rotationally fixed on a common, radially outer ring gear shaft, which is lockable by the second shift element on the gearbox housing.

7. The drive device according to claim 6, wherein the ring gear in the third planetary gearing meshes with planet gears which are rotatably mounted on a planet gear carrier and which mesh in turn with a sun gear, which is firmly connected as a second reaction element to the gearbox housing.

8. The drive device according to claim 7, wherein the third planetary gearing and the second planetary gearing are coupled together across an intermediate shaft, which carries, in rotationally fixed manner, both a sun gear of the second planetary gearing and a connecting flange, which is attached to the planet gear carrier of the third planetary gearing.

9. The drive device according to claim 8, wherein, in the second planetary gearing, the sun gear meshes with planet gears, which are rotatably mounted on a planet gear carrier and which, in turn, mesh with a ring gear, and
wherein the ring gear of the second planetary gearing is coupled by a radially inner ring gear shaft to the output element of the first planetary gearing.

10. The drive device according to claim 9, wherein the planet gear carrier in the second planetary gearing is engageable by means of a first shift element, either from a neutral position to the first hybrid mode or from the neutral position to the torque distribution mode.

11. The drive device according to claim 1, wherein the additional drive machine, the first through third planetary gearings, the second shift element and the first shift element are arranged in this sequence in succession in a vehicle transverse direction from an inside of the vehicle to an outside of the vehicle.

12. The drive device according to claim 2, wherein the additional drive machine is coupled across a reduction stage for a torque transformation to the transmission input shaft; and
wherein the additional drive machine is arranged axially parallel to the flange shaft.

13. The drive device according to claim 3, wherein the additional drive machine is coupled across a reduction stage for the torque transformation to the transmission input shaft; and
wherein the additional drive machine is arranged axially parallel to the flange shaft.

14. The drive device according to claim 3, wherein the transmission input shaft, the transmission output shaft and the transmission-side flange shaft are arranged nested coaxially to each other, and
wherein the transmission input shaft is formed as an outer hollow shaft, in which the transmission output shaft is arranged as an inner hollow shaft, through which the transmission-side flange shaft extends.

15. The drive device according to claim 4, wherein the transmission input shaft, the transmission output shaft and the transmission-side flange shaft are arranged nested coaxially to each other, and
wherein the transmission input shaft is formed as an outer hollow shaft, in which the transmission output shaft is arranged as an inner hollow shaft, through which the transmission-side flange shaft extends.

16. The drive device according to claim 3, wherein the reaction element of the first planetary gearing at the input end and a ring gear of the third planetary gearing are rotationally fixed on a common, radially outer ring gear shaft, which is lockable by the second shift element on the gearbox housing.

17. The drive device according to claim 4, wherein the reaction element of the first planetary gearing at the input end and a ring gear of a third planetary gearing are rotationally fixed on a common, radially outer ring gear shaft, which is lockable by a second shift element on the gearbox housing.

18. The drive device according to claim 5, wherein the reaction element of the first planetary gearing at the input end and a ring gear of a third planetary gearing are rotationally fixed on a common, radially outer ring gear shaft, which is lockable by the second shift element on the gearbox housing.

19. The drive device according to claim 2, wherein the additional drive machine, the first through third planetary gearings, the second shift element and the first shift element are arranged in this sequence in succession in a vehicle transverse direction from an inside of the vehicle to an outside of the vehicle.

20. The drive device according to claim 3, wherein the additional drive machine, the first through third planetary gearings, the second shift element and the first shift element are arranged in this sequence in succession in a vehicle transverse direction from an inside of the vehicle to an outside of the vehicle.

* * * * *